United States Patent
Panchapakesan

(10) Patent No.: US 11,803,405 B2
(45) Date of Patent: Oct. 31, 2023

(54) CONFIGURABLE VIRTUAL MACHINES

(71) Applicant: Amazon Technologies, Inc., Seattle, WA (US)

(72) Inventor: Rajan Panchapakesan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 121 days.

(21) Appl. No.: 16/907,078

(22) Filed: Jun. 19, 2020

(65) Prior Publication Data

US 2020/0319911 A1    Oct. 8, 2020

Related U.S. Application Data

(63) Continuation of application No. 16/179,543, filed on Nov. 2, 2018, now Pat. No. 10,691,483, which is a continuation of application No. 14/997,693, filed on Jan. 18, 2016, now Pat. No. 10,120,708, which is a continuation of application No. 13/653,981, filed on Oct. 17, 2012, now Pat. No. 9,239,727.

(51) Int. Cl.
*G06F 9/455* (2018.01)
*G06F 9/445* (2018.01)
*G06Q 10/0631* (2023.01)

(52) U.S. Cl.
CPC ...... *G06F 9/45558* (2013.01); *G06F 9/44505* (2013.01); *G06Q 10/06315* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,247,687 A | * | 9/1993 | Eilert | G06F 12/121 |
| | | | | 711/E12.07 |
| 5,889,989 A | * | 3/1999 | Robertazzi | G06F 9/5066 |
| | | | | 718/105 |
| 6,094,680 A | * | 7/2000 | Hokanson | H04N 21/2225 |
| | | | | 725/1 |
| 6,219,654 B1 | * | 4/2001 | Ruffin | G06Q 10/06375 |
| | | | | 705/7.29 |
| 6,725,204 B1 | * | 4/2004 | Gusley | G06Q 40/04 |
| | | | | 705/37 |
| 8,175,863 B1 | | 5/2012 | Ostermeyer et al. | |
| 8,219,653 B1 | * | 7/2012 | Keagy | G06F 9/45537 |
| | | | | 709/222 |
| 8,296,329 B1 | * | 10/2012 | Das | G06F 9/4856 |
| | | | | 707/802 |
| 8,312,136 B2 | * | 11/2012 | Tanaka | G06F 11/3409 |
| | | | | 709/224 |
| 8,396,807 B1 | * | 3/2013 | Yemini | G06F 9/5077 |
| | | | | 705/77 |
| 8,495,648 B1 | | 7/2013 | Brandwine et al. | |
| 8,510,429 B1 | * | 8/2013 | Thakur | H04L 41/0826 |
| | | | | 709/224 |

(Continued)

*Primary Examiner* — Adam Lee
(74) *Attorney, Agent, or Firm* — Alexander A. Knapp; Kowert, Hood, Munyon, Rankin & Goetzel, P.C.

(57) ABSTRACT

Systems and methods for configuring a virtual machine provided by a remote computing system based on the availability of one or more remote computing resources and respective corresponding prices of the one or more remote computing resources.

20 Claims, 9 Drawing Sheets

(56) References Cited

U.S. PATENT DOCUMENTS

| | | |
|---|---|---|
| 8,595,806 B1 | 11/2013 | Gabrielson |
| 8,606,922 B1 | 12/2013 | Greenfield et al. |
| 8,627,468 B2 | 1/2014 | Kakadia et al. |
| 8,631,458 B1 | 1/2014 | Banerjee |
| 8,775,577 B1 | 7/2014 | Alford et al. |
| 8,825,964 B1 | 9/2014 | Sopka et al. |
| 8,849,947 B1 | 9/2014 | Artzi et al. |
| 8,918,761 B1* | 12/2014 | Whitcomb .............. G06F 9/505 709/224 |
| 8,924,539 B2* | 12/2014 | Ferris .................... G06F 9/5072 709/224 |
| 8,966,581 B1 | 2/2015 | Gross et al. |
| 9,183,059 B1* | 11/2015 | Fausak ................. G06F 9/5077 |
| 9,336,030 B1* | 5/2016 | Marr ..................... G06F 9/5077 |
| 9,495,222 B1* | 11/2016 | Jackson ............. G06F 11/3433 |
| 10,691,483 B1 | 6/2020 | Panchapakesan |
| 2003/0036865 A1* | 2/2003 | Zhuo ..................... G06Q 10/06 702/81 |
| 2003/0135630 A1 | 7/2003 | Murrell et al. |
| 2003/0212643 A1* | 11/2003 | Steele .................... G06Q 10/10 705/400 |
| 2004/0010592 A1 | 1/2004 | Carver et al. |
| 2004/0015452 A1* | 1/2004 | Hertz .................. G06Q 20/102 705/400 |
| 2004/0228279 A1 | 11/2004 | Midtun et al. |
| 2005/0160424 A1 | 7/2005 | Broussard et al. |
| 2005/0262505 A1* | 11/2005 | Esfahany ............. G06F 9/5016 718/1 |
| 2005/0278441 A1 | 12/2005 | Bond et al. |
| 2006/0025985 A1 | 2/2006 | Vinberg et al. |
| 2007/0083501 A1 | 4/2007 | Pedersen et al. |
| 2007/0083655 A1 | 4/2007 | Pedersen |
| 2007/0174410 A1 | 7/2007 | Croft et al. |
| 2007/0234302 A1 | 10/2007 | Suzuki et al. |
| 2008/0034364 A1 | 2/2008 | Lam et al. |
| 2008/0098006 A1 | 4/2008 | Pedersen et al. |
| 2008/0109813 A1* | 5/2008 | Narita ................... G06F 9/5083 718/104 |
| 2008/0147460 A1* | 6/2008 | Ollivier ................. G06Q 10/00 705/7.35 |
| 2008/0201711 A1 | 8/2008 | Amir Husain |
| 2008/0244607 A1* | 10/2008 | Rysin ................... G06Q 30/06 718/104 |
| 2008/0301674 A1 | 12/2008 | Faus |
| 2009/0013325 A1* | 1/2009 | Kobayashi ........ G06F 16/24532 718/104 |
| 2009/0070404 A1 | 3/2009 | Mazzaferri |
| 2009/0119673 A1* | 5/2009 | Bubba ..................... G06F 9/50 713/300 |
| 2009/0164993 A1* | 6/2009 | Flake ................ G06F 16/24575 718/1 |
| 2009/0222560 A1 | 9/2009 | Gopisetty et al. |
| 2009/0265706 A1 | 10/2009 | Golosovker et al. |
| 2009/0276771 A1* | 11/2009 | Nickolov ............ H04L 67/1008 718/1 |
| 2009/0288084 A1* | 11/2009 | Astete ................. G06Q 30/0601 718/1 |
| 2009/0327905 A1 | 12/2009 | Mascarenhas et al. |
| 2010/0011238 A1 | 1/2010 | Nakamura et al. |
| 2010/0036698 A1* | 2/2010 | Garrison ................. G06Q 20/20 705/16 |
| 2010/0037089 A1 | 2/2010 | Krishnan et al. |
| 2010/0057913 A1 | 3/2010 | DeHaan |
| 2010/0095000 A1* | 4/2010 | Kettler .................. G06F 9/5077 709/226 |
| 2010/0138780 A1 | 6/2010 | Marano et al. |
| 2010/0199285 A1* | 8/2010 | Medovich ............... G06F 9/455 718/104 |
| 2010/0211698 A1 | 8/2010 | Krishnaswamy |
| 2010/0268812 A1 | 10/2010 | Mohrmann et al. |
| 2010/0287544 A1 | 11/2010 | Bradfield et al. |
| 2011/0004500 A1* | 1/2011 | Nathuji ................. G06F 1/3203 705/7.37 |
| 2011/0055385 A1* | 3/2011 | Tung ................... H04L 67/1097 718/1 |
| 2011/0055712 A1 | 3/2011 | Tung et al. |
| 2011/0126207 A1 | 5/2011 | Wipfel et al. |
| 2011/0137758 A1 | 6/2011 | Bienias |
| 2011/0138147 A1* | 6/2011 | Knowles ............. G06F 9/45558 711/170 |
| 2011/0145380 A1 | 6/2011 | Glikson et al. |
| 2011/0154353 A1* | 6/2011 | Theroux ............... G06F 9/5038 718/104 |
| 2011/0202405 A1 | 8/2011 | Clark et al. |
| 2011/0225277 A1 | 9/2011 | Freimuth et al. |
| 2011/0231839 A1 | 9/2011 | Bennett et al. |
| 2011/0238460 A1 | 9/2011 | Al-Dawsari et al. |
| 2011/0246904 A1 | 10/2011 | Pinto et al. |
| 2011/0270963 A1 | 11/2011 | Saito et al. |
| 2011/0296024 A1 | 12/2011 | Madani et al. |
| 2012/0011514 A1* | 1/2012 | Burton ............... G06F 11/3442 718/100 |
| 2012/0016721 A1 | 1/2012 | Weinman |
| 2012/0042320 A1* | 2/2012 | Jamjoom ................. G06F 9/50 718/104 |
| 2012/0084262 A1 | 5/2012 | Dwarampudi et al. |
| 2012/0131161 A1* | 5/2012 | Ferris .................... G06Q 30/02 709/223 |
| 2012/0151480 A1 | 6/2012 | Diehl et al. |
| 2012/0180045 A1 | 7/2012 | Bhogal et al. |
| 2012/0240113 A1 | 9/2012 | Hur |
| 2012/0246215 A1 | 9/2012 | Gopshtein et al. |
| 2012/0260248 A1* | 10/2012 | Katiyar ............... G06F 9/45533 718/1 |
| 2012/0272234 A1* | 10/2012 | Kaiser ................. G06F 11/3442 718/1 |
| 2012/0284408 A1 | 11/2012 | Dutta et al. |
| 2012/0290445 A1* | 11/2012 | Wilson ............. G06Q 10/06312 705/27.1 |
| 2012/0290725 A1 | 11/2012 | Podila |
| 2012/0297041 A1 | 11/2012 | Momchilov |
| 2012/0297188 A1 | 11/2012 | van der Linden |
| 2012/0331476 A1 | 12/2012 | Saffre |
| 2013/0007088 A1 | 1/2013 | Alfredo et al. |
| 2013/0036416 A1 | 2/2013 | Raju et al. |
| 2013/0042115 A1 | 2/2013 | Sweet et al. |
| 2013/0042234 A1* | 2/2013 | DeLuca ............... G06F 9/45533 718/1 |
| 2013/0054426 A1* | 2/2013 | Rowland ............... G06F 9/5072 718/1 |
| 2013/0067471 A1* | 3/2013 | Kruglick ................. G06F 9/4856 718/1 |
| 2013/0074072 A1 | 3/2013 | Kennedy |
| 2013/0085882 A1* | 4/2013 | Gounares ............ G06F 9/44505 705/26.1 |
| 2013/0091502 A1 | 4/2013 | Kang et al. |
| 2013/0111468 A1* | 5/2013 | Davis ..................... G06F 9/5077 718/1 |
| 2013/0117157 A1* | 5/2013 | Iyoob ..................... G06Q 30/06 705/26.41 |
| 2013/0117454 A1* | 5/2013 | Rangarajan ........... G06F 9/5011 709/226 |
| 2013/0124712 A1 | 5/2013 | Parker |
| 2013/0145367 A1 | 6/2013 | Moss et al. |
| 2013/0179648 A1* | 7/2013 | Yagame ................. G06F 3/0685 711/E12.001 |
| 2013/0212576 A1* | 8/2013 | Huang ................. G06F 9/45558 718/1 |
| 2013/0219068 A1* | 8/2013 | Ballani .................. G06Q 10/063 709/226 |
| 2013/0238786 A1 | 9/2013 | Khesin |
| 2013/0238804 A1 | 9/2013 | Tanino et al. |
| 2013/0238805 A1 | 9/2013 | Catrein et al. |
| 2013/0247136 A1 | 9/2013 | Chieu et al. |
| 2013/0268672 A1 | 10/2013 | Justafort et al. |
| 2013/0268940 A1 | 10/2013 | Gmach et al. |
| 2013/0283263 A1 | 10/2013 | Elemary |
| 2013/0290538 A1 | 10/2013 | Gmach et al. |
| 2013/0326505 A1 | 12/2013 | Shah |
| 2013/0346978 A1 | 12/2013 | Jiang et al. |

(56) References Cited

U.S. PATENT DOCUMENTS

2014/0047081 A1* 2/2014 Edwards ............ H04L 63/0272
                                                      709/220
2014/0068053 A1   3/2014 Ravi et al.
2014/0101487 A1   4/2014 Kakadia et al.

* cited by examiner

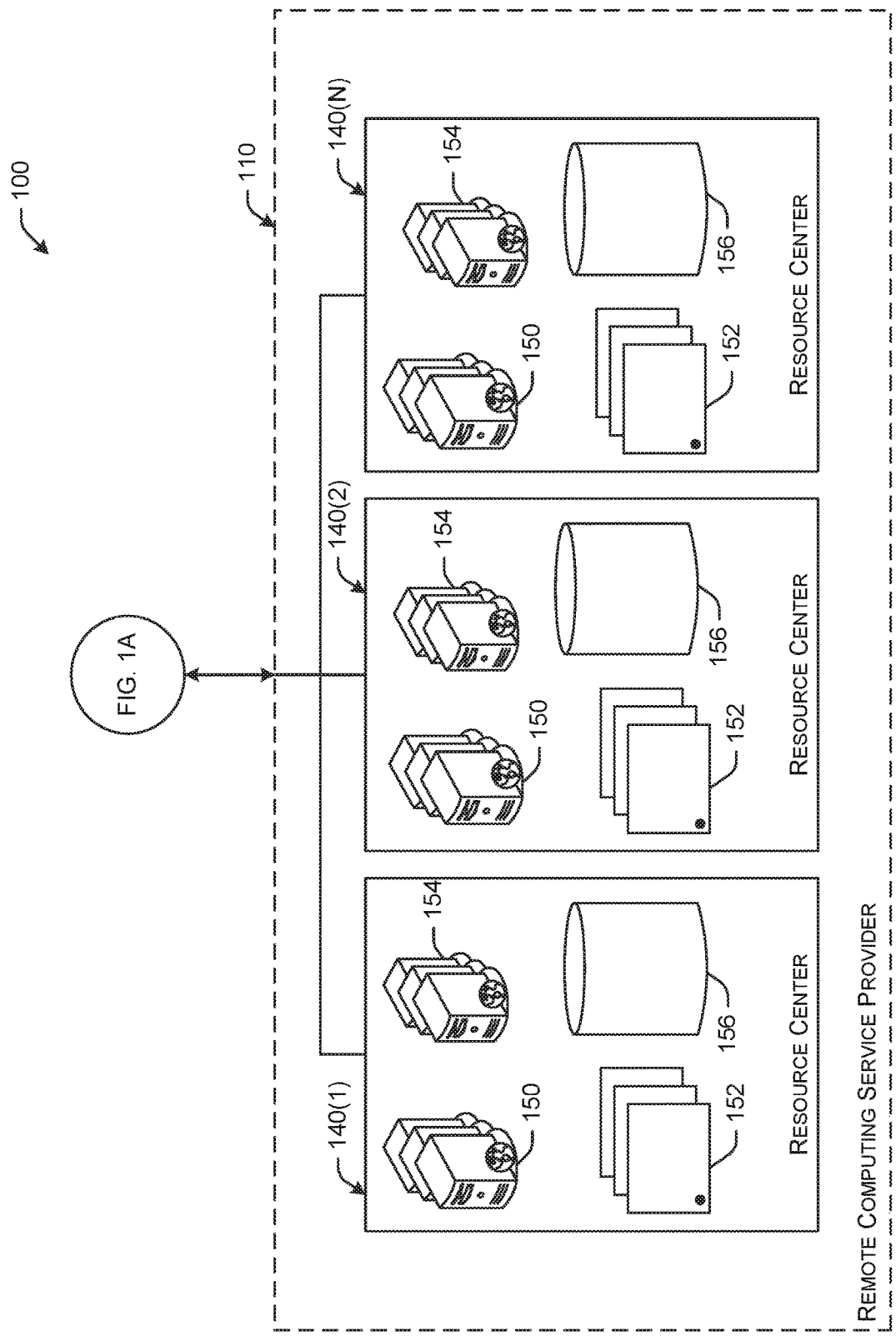

PLEASE CONFIGURE YOUR INSTANCE

| COMPUTATIONAL CORES | PRICE | TOTAL PRICE |
|---|---|---|
| ○ 1 CORE | $1 | $1 |
| ○ 2 CORES | $2 | $2 |
| ● 4 CORES | $4 | $4 |
| ○ 8 CORES | $8 | $8 |

MEMORY

| [2] GB | $0.88/GB | $1.76 |
|---|---|---|

PLATFORM

| ○ 32 BIT | $1.89 | $1.89 |
|---|---|---|
| ○ 64 BIT | $2.32 | $2.32 |

FIG. 8

CONFIGURABLE VIRTUAL MACHINES

CROSS-REFERENCE TO RELATED APPLICATION

This patent application is a continuation of U.S. patent application Ser. No. 16/179,543, filed Nov. 2, 2018, which is a continuation of U.S. patent application Ser. No. 14/997,693, filed Jan. 18, 2016, now U.S. Pat. No. 10,120,708, which is a continuation of U.S. patent application Ser. No. 13/653,981, filed Oct. 17, 2012, now U.S. Pat. No. 9,239,727, which are hereby incorporated by reference herein in their entirety.

BACKGROUND

With increasing availability of inexpensive communications bandwidth, remote computing or cloud computing, where processing and storage resources may be located remotely from the point of usage of the processing and storage resources, has become more widely available. Third party entities may offer these remote computing resources to organizations and individual users remotely from the organizations and users. Remote computing methods may, therefore, enable an organization to outsource its information technology needs to an outside vendor and allow the outside vendor to provide processing and storage resources, as well as information security, scalability, reliability, and the like.

The third party providers of the remote computing resources may, in turn, make relatively effective use of computing resources by centralizing the resources and providing computing resources to multiple organizations and users. In so doing, remote computing providers may have a plurality of computers or servers, a plurality of storage devices, and a variety of other computing resources to meet the computing and storage needs of the multiple organizations and/or individuals for whom the remote computing providers provide service.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

FIGS. 1A and 1B are schematic diagrams that illustrate an example architecture for providing remote computing services, in accordance with embodiments of the disclosure.

FIG. 8 is a schematic diagram illustrating an example user interface for selecting remote computing resources to customize a virtual machine, in accordance with embodiments of the disclosure.

DETAILED DESCRIPTION

Overview

Figure 1A:
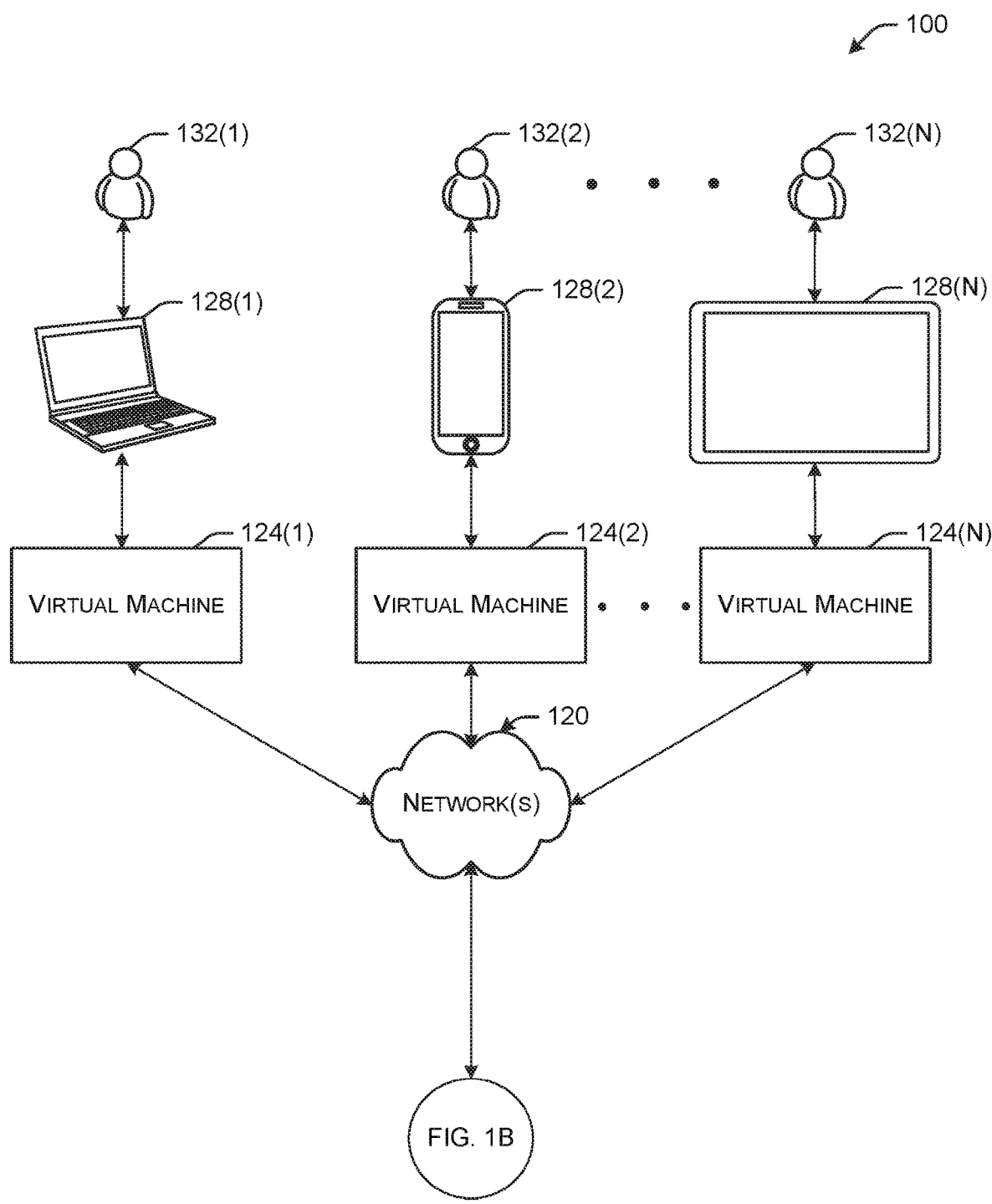

Embodiments of the present disclosure are directed to, among other things, providing remote computing resources, such as cloud computing services, in a dynamic and customizable fashion. In one aspect, remote computing services may be offered to users of the remote computing resources via communicative connections such as the Internet. In certain aspects, a particular user may be able to select computing resources that may be used in providing the remote computing services offered to the user. Therefore, an entity providing remote computing services, such as a remote computing service provider, may be configured to provide remote computing services to the user based on computing resources selected by the user. The remote computing service computer may provide the user with a virtual machine that uses the resources that have been selected by the user. Indeed, the user may be able to select computing resources prior to receiving and/or utilizing the remote computing services. Additionally, the user may be able to select additional computing resources after already using the remote computing service. In other words, the user may be able to modify the remote computing resources that are used to provide the user with remote computing services. The user may therefore customize his/her virtual machine, also known as an instance, prior to launch or after launch.

In the context of this disclosure, the user may be any suitable entity that may acquire and/or use remote computing services, including individuals, organizations, corporations, non-profit organizations, or the like. The remote computing resources may be any suitable computing resources, including processing resources, such as central processing units and/or graphics processing units, memory resources, such as dynamic random access memory (DRAM), storage resources, such as solid state disk drives (SSDs), hard disk drives (HDD), or networking devices. The remote computing resources, in certain embodiments, may be operated at geographic locations that are remote or otherwise accessible via a network by the user. The virtual machine, or instance, may appear to the user as a server providing computing services that the user may be able to access using a user device. The virtual machine may provide the user the look and/or feel of a local computing machine. Therefore, the virtual machine may be seamlessly provided to the user by the remote computing service provider in a manner that appears to the user as if he/she/they are operating and/or using a local computing machine. For example, the user may be able to "log-in" to the virtual machine using the user device to execute computing tasks, such as word processing or spreadsheet tasks.

The remote computing service provider that provides the remote computing services in the form of providing virtual machines to multiple users may have one or more service centers that house the various remote computing resources that may be selected and mixed and matched by a user to provide virtual machines to various users. These service centers, in some cases, may be geographically separated from each other. These computing resource centers may have one or more remote computing servers that may provide the various virtual machines to the corresponding respective users. The remote computing servers may receive a configuration file, or other indication of a configuration, for configuring a virtual machine for a particular user. The configuration file may include various elements associated with the remote computing resources that may be used to provide the virtual machine. These various elements of the configuration file may include an indication of remote computing resources that may be allocated to provide the requested virtual machine. Therefore, the remote computing servers may "build" a virtual machine by accessing and/or using remote computing resources indicated on the configuration files. In certain embodiments, particular remote computing resources may be uniquely allocated to a particular virtual machine.

The configuration file may be generated by one or more configuration servers. These configuration servers may be configured to generate and/or receive an inventory of resources that may be available at various resource centers of the remote computing service provider. The configuration servers may further be configured to provide to existing users and/or new users an indication of remote computing resources that are available at the various resource centers. The configuration servers may further be configured to interact with a user, or and agent thereof, such as a system administrator associated with the user, that may select one or more remote computing resources to configure his/her/their virtual machine. The interaction may be enabled by the user being presented a selection of remote computing resources available for configuring their virtual machine. The interaction may be conducted, in these embodiments, via a communications network or other suitable communicative link as well as the user's user device. Therefore, the configuration file may be generated based at least in part on received user input indicative of a selection of remote computing resources.

In certain embodiments, the indication of remote computing resources available and presented to a user by the configuration servers may be based at least in part on the inventory of remote computing resources as identified by the configuration server. Therefore, in certain embodiments, the remote computing resources selected by a user for "building" a virtual machine may be based at least in part on an assessment of which resources are available and not being used in providing virtual machines to other users. Once the configuration server receives an indication of remote computing resources requested by the user, the configuration server may generate an indication of the requested remote computing resources, such as in the form of the configuration file. In these and other embodiments, the may further update the inventory of remote computing resources when a particular user relinquishes the use of one or more remote computing resources. For example, if a particular user no longer needs a virtual machine provided to that user, the configuration servers may indicate the resources associated with that virtual machine as being available again. Therefore, it will be appreciated that in certain embodiments, the configuration servers may update one or more inventories of remote computing resources based at least in part on one or more of deployment of remote computing resources, return of remote computing resources, or addition or removal of remote computing resources for the purposes of offering remote computing services by the provider of remote computing resources.

In certain embodiments, the configuration servers may be configured to provide pricing information to remote computing resources based at least in part on their availability. Indeed, these embodiments may allow or differential pricing of remote computing resources based upon current availability and/or utilization of a variety of classes of remote computing resources. In certain cases, a particular remote computing resource that has a relatively high level of availability may be priced at a level less than a level of pricing had that remote computing resource had a relatively lower availability. For example, HDD storage may be priced at $0.25/terabyte (Tb)/month if the remote computing service provider has 1024 Tb of storage available, but may be priced at $0.30/Tb/month if the remote computing service provider has 256 Tb or less of storage available.

The configuration servers, therefore, may have a variety of pricing models and/or algorithms that may be used to determine pricing of remote computing resources. The configuration servers may execute these models and/or algorithms on one or more processors of the configuration servers. The pricing ascertained from the pricing models may be used to update a price list associated with presenting users with user interfaces (UI) with remote computing resource availability. In other words, remote computing resources that may be selected by the user to configure a virtual machine may present pricing of individual remote computing resources, so that the user may decide which resource to pick based at least in part on the pricing of the resources and/or pricing of a fully configured virtual machine.

In certain embodiments, the configuration servers may provide the pricing of the remote computing resources for a limited period of time. In other words, when the pricing of the various available remote computing resources are presented to a user for selection, those prices may be available for a predetermined period of time. Therefore, a user may need to make a selection of the resources at the corresponding respective prices before the prices expire to not risk being offered new and/or updated prices corresponding to the offered remote computing resources. In some cases, the user may be presented, such as on the UI, with a time, a timer, and/or an indication of the time for which the prices presented to the user may be in effect. Based on this "freshness time" the user, in some cases, may be able to determine how long the user will take to decide which remote computing resources are to be selected.

The configuration servers, in certain embodiments, may provide an availability and/or corresponding pricing of remote computing resources based on an application basis and/or a limited time basis. In other words, a user may need an increase or decrease in remote computing resources for its corresponding virtual machine for a predetermined period of time and may request changes to the configuration of their virtual machine only during that predetermined period of time. As an example, consider a tax accounting firm that may need additional remote computing resources for a period of two months preceding the time when federal income taxes are due. In these cases, the configuration servers may be configured to provide remote computing resources to a particular user for a predetermined period of time as an application and/or project basis. In certain embodiments, the configuration servers may be configured to provide a pricing for remote computing resources based at least in part on information related to the time period for which the resources may be deployed.

The configuration servers may, in certain embodiments, present a preconfigured template of a virtual machine that may further be configured by a user to build his/her/their virtual machine. In other words, the configuration servers may present a virtual machine with preselected remote computing resources. The configuration servers may further be able to accept changes to the preselected remote computing resources. These changes may be made by the user to customize the virtual machine resulting from the selected remote computing resources. In these embodiments, the configuration servers may further determine pricing of a variety of remote computing resources. This pricing may be determined based at least in part on the availability and/or utilization of various classes of remote computing resources. The pricing information may be presented to the user while the user is making selections of remote computing resources. Therefore, the user interface for making the selections of the remote computing resources may present the pricing of each of the remote computing resources so that the user can see what the cost may be as he/she/they make their selections and/or modifications.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIGS. 1A and 1B depict an example architecture 100 in which techniques for providing remote computing services may be implemented in accordance with embodiments of the disclosure. In architecture 100, one or more remote computing service providers 110 may be configured to provide remote computing services via one or more networks 120 by providing one or more virtual machines 124(1)-(N), also referred to as instances and collectively or individually referred to as virtual machine 124, that may be accessed by one or more user devices 128(1)-(N), collectively or individually referred to as user device 128, by users 132(1)-(N), collectively or individually referred to as 132. Although a single respective user device 128 and a single respective user 132 is depicted as accessing each virtual machine 124, it will be appreciated that there may be any number of individuals and/or users 132 accessing each of the virtual machines 124 via any number of user devices 128.

The users 132, as used herein, may refer to either an organization or an individual. The organization may be a company, non-profit organization, for-profit organization, a religious organization, a community organization, a government agency, or the like. Therefore, each organization may have multiple individuals. Indeed, multiple individuals from an organization may be able to access a virtual machine 124 associated with that organization. For example, a company may purchase remote computing services from a remote computing service provider 110 and employees of that company may be able to access the virtual machine 124 provided to the company using respective user devices 128.

The user devices 128 may be any variety of computing devices including, but not limited to, servers, desktop computers, notebook computers, netbook computers, tablet computing devices, pad computing devices, personal digital assistants (PDAs), smart phones, digital readers, or combinations thereof. In some cases, the user devices 128 may be "intelligent devices" that may execute one or more programs and user applications locally on processor(s) (not shown) of the user devices 128. In other cases, the user devices 128 may be "dumb terminals" configured to primarily execute software, programs, or user applications related to serving, displaying, or otherwise rendering information or content provided from sources external to the user devices 128, such as rendering displays associated with the corresponding virtual machine 124 provided by the remote computing service provider 110. Indeed, the architecture 100 may include both "intelligent devices" and "dumb terminals." Furthermore, the architecture 100 may include a variety of user device types. For example, there may be multiple users 132 each accessing the remote computing servers 150 via different types of user devices 128.

The remote computing service provider 110 may include one or more remote computing resource centers 140(1)-(N), collectively or individually referred to as remote computing resource centers 140, and may house one or more remote computing resources, such as one or more remote computing servers 150, one or more memory devices 152, one or more configuration servers 154, one or more storage devices 156, or the like. The remote computing resource centers 140 may be geographically separated from each other in certain embodiments. In other embodiments, the remote computing resource centers 140 may be relatively proximal to each other.

In certain embodiments, the individual remote computing resource centers 140, and remote computing resources 150, 152, 154, 156 therein, may be configured to provide particular virtual machines 124. In other words, a particular virtual machine 124 may be served from a single remote computing service center 140. In other embodiments, a virtual machine 124 may be provided from more than one remote computing service center 140, using remote computing resources 150, 152, 154, 156 located at the various remote computing resource centers 140.

Although a single remote computing server 150, memory device 152, configuration server 154, and storage device 156 is depicted at each of the remote computing resource centers 140, it will be appreciated that there may be any number and/or amount of these resources 150, 152, 154, 156 at each of the remote computing resource centers 140. In addition, there may be a variety of each of these resources with a variety of processing capabilities, bandwidth, bus size, latency, manufacturers, or the like. It will be appreciated that there may be a variety of remote computing resources, including ones that have not been depicted herein. These remote computing resources may include, but are not limited to processing cores, graphics processors/cores, 32-bit systems, 64-bit systems, solid state drives (SSD), magnetic and/or optical hard disk drives (HDD), tape drives, compact disk (CD) drives, digital video disk (DVD) drives, volatile memory, non-volatile memory, or the like.

In one aspect, the remote computing servers 150 may be configured to execute and provide virtual machine instances 124. Each remote computing server 150 may be configured to provide either single or multiple virtual machines 124. The remote computing servers 150 may be any suitable server for configuring, managing, and/or providing remote computing services in the form of virtual machines 124 to one or more users 132. For example, the remote computing servers 150 may be rack mounted servers, blade servers, or any other suitable computing configuration.

The remote computing servers 150 may be configured to receive a configuration file or other indication of a virtual machine configuration and based at least in part on the configuration file, deploy remote computing resources 150, 152, 154, 156, to provide the user 132 with a virtual machine 124. In one aspect, the received configuration file may be indicative of a virtual machine configuration selected by the user 132. The configuration file may be received in the form of one or more data packets by the remote computing servers 150 from the configuration servers 154.

In effect, multiple virtual machine instances 124 may be allocated from a single remote computing server 150 or group of remote computing servers 150. Therefore, when computing resources 150, 152, 154, 156 are provided to a user 132, a new virtual machine instance 124 may be launched on the remote computing servers 150. When a user 132 returns the computing resources 150, 152, 154, 156, or otherwise ceases to receive the remote computing services from the remote computing service provider 110, the instance 124 associated therewith may be terminated.

Memory devices 152 as used herein may include any variety of electronic storage. The memory devices 152 may store program instructions that are loadable and executable on the processor(s) associated with the remote computing servers 150, as well as data generated during the execution of these programs. Depending on the configuration and type of remote computing servers 150, the memory devices 152 may be volatile (such as random access memory (RAM)) and/or non-volatile (such as read-only memory (ROM), flash memory, etc.). In some implementations, the memory devices 152 may include multiple different types of memory, such as static random access memory (SRAM), dynamic random access memory (DRAM), and/or ROM. Although depicted at a location outside of the remote computing servers 150, it will be appreciated that in certain embodiments, the memory devices may be located within a housing of one or more of the remote computing servers 150.

The configuration servers 154, may be similar to the remote computing servers 150 in that the configuration servers may be any suitable type of server, such as a blade server or a rack mounted server. Although the architecture 110 is depicted having a single configuration server 154 at each of the remote computing resource centers 140, there may be more than one, one or no configuration server at a particular remote computing resource center 140. In certain cases, a single configuration server 154 may provide virtual machine configuration services to multiple remote computing resource centers 140 and multiple associated remote computing servers 150.

The configuration servers 154 may be configured to identify the availability and/or the utilization of various remote computing resources. The configuration servers 154 may further be configured to provide an indication available remote computing resources to users of remote computing services. The configuration servers 154 may still further be configured to solicit configuration requests from a user 132 requesting and/or modifying remote computing services. For example, the configuration servers 154 may be able to render a user interface on the user device 128 associated with the user 132 to solicit user input related to virtual machine configurations. Further yet, the configuration servers 154 may be configured to generate a configuration file, or other indication of a requested configuration, based on a selection of resources that may be used to build a virtual machine. The configuration servers 154 may provide the configuration file to one or more remote computing servers 150 to allocate remote computing resources 150, 152, 154, 156 corresponding to the configuration file.

In certain embodiments, the configuration servers 154 may be configured to identify one or more pricing models and/or algorithms that may provide pricing of various remote computing resources 150, 152, 154, and 156, based at least in part on the availability and/or utilization of the remote computing resources 150, 152, 154, and 156. Therefore, the configuration servers 154 may generate a price list for various remote computing resources. In certain embodiments, this price list may be updated by the configuration servers 154 when there is a change in the deployment of remote computing resources 150, 152, 154, 156. In other embodiments, the price list may be modified at predetermined times and/or on a periodic basis by considering a new inventory of available and/or deployed remote computing resources 150, 152, 154, 156 by the configuration servers 154.

The configuration servers 154 may further be configured to present the pricing of one or more remote computing resources 150, 152, 154, 156 to the user 132 when soliciting remote computing resource selections from the user 132 for the purpose of configuring the user's virtual machine 124. Therefore, in one aspect, the user may select between and among various remote computing resources 150, 152, 154, 156 based at least in part on the corresponding respective pricing of the various remote computing resources 150, 152, 154, 156. In some cases the models used to price the one or more remote computing resources 150, 152, 154, 156 may be based at least in part on predictions of the price elasticity of the various remote computing resources and/or predictions of a user's propensity to select a particular remote computing resource 150, 152, 154, 156 at various price points.

Storage capacity 156, as used herein, may refer to any form of electronic storage that may be used and/or may be available to a particular user 132 to store electronic information or data. The information or data may be in any form of analog or digital data. In certain embodiments, digital data storage capacity may be offered by the provider of remote computing service provider 110. Electronic information or data stored on the storage capacity 156 may include, but is not limited to, computer files, documents, audio files, video files, other media files, computer programs, applications, scripts, files containing proprietary, confidential, personal, or sensitive information, or combinations thereof.

It will further be appreciated that the storage capacity 156 provided to a particular user 132 may include one storage device, portions of a storage device, more than one storage device, or more than one portion of the storage devices. For example, if a particular user requires 10 terabytes (Tb) of storage capacity, then the provider of the remote computing resources may allocate five 2 Tb hard disk drives (HDDs) to provide the full 10 Tb requirement. Alternatively, the 10 Tb capacity may be provided using three 3 Tb HDDs and 1 Tb of a 3 Tb HDD. The storage devices 156, or portions thereof, that provide the storage capacity to the user 132 of the remote computing services may be of any suitable type of data storage or mass storage device with any suitable storage capacity. The storage devices may be, for example, any combinations of HDDs of any format and interface(s), optical storage drives, opto-magnetic storage drives, compact disc (CD) drives, digital video disc (DVD) drives, solid state drives (SSD), flash memory drives, or the like.

The memory devices 152 and/or the storage devices 156, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

The networks 120 may include any one or a combination of different types of suitable communications networks, such as cable networks, the Internet, wireless networks, cellular networks, and other private and/or public networks. Furthermore, the networks 120 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing the remote computing servers 150 over the networks 120 using the user device 128, it will be appreciated that the users 132 may access one or more other elements via the network 120. It is also noted that the described techniques may apply in other client/server arrangements (e.g., set-top boxes, etc.), as well as in non-client/server arrangements (e.g., locally stored software applications, etc.).

Figure 2:
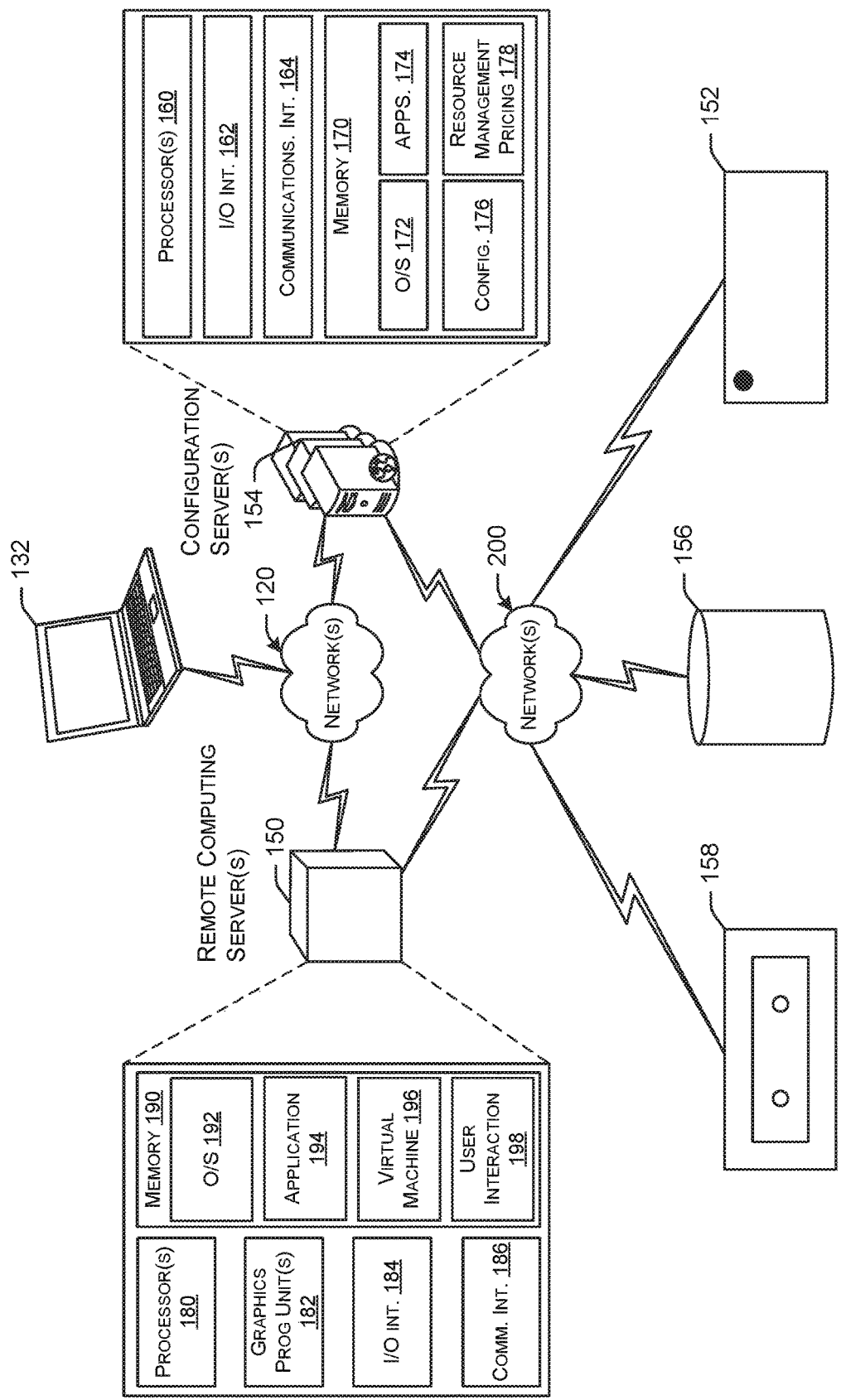
FIG. 2 is a schematic diagram that illustrates an example resource center for providing remote computing services to a user, in accordance with embodiments of the disclosure.

Referring now to FIG. 2, an illustration of an example resource center 140 for providing remote computing services to the user 132, in accordance with embodiments of the disclosure is described. The remote computing servers 150 may include one or more processors 180, one or more graphics processing units (GPU) 182, one or more input output (I/O) interfaces 184, one or more communications interfaces 186, and one or more memories 190. It will be appreciated that the remote computing servers 150 may include other components or elements that enable the remote computing servers 150 to perform the methods and processes described herein in accordance with embodiments of the disclosure.

The one or more processors 180 may be configured to execute and/or operate one or more instructions, applications, and/or software stored in the memory 190 of the remote computing servers 150 to provide remote computing services. The processors 180 may further be configured to receive input from or provide output to user interfaces of the remote computing servers 150.

In some examples, the one or more processors 180 of the remote computing servers 150 may be implemented as appropriate in hardware, software, firmware, or combinations thereof. Software or firmware implementations of the one or more processors 180 may include computer-executable or machine-executable instructions written in any suitable programming language to perform the various functions described. Hardware implementations of the processors 180 may be configured to execute computer-executable or machine-executable instructions to perform the various functions described. The one or more processors 180 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The remote computing server 150 may also include a chipset (not shown) for controlling communications between the one or more processors 180 and one or more of the other components of the remote computing server 150. The one or more processors 180 may also include one or more application specific integrated circuits (ASICs) or application specific standard products (ASSPs) for handling specific data processing functions or tasks.

The GPU 182 may include any suitable electronic hardware, software, or combination thereof that performs a rendering and/or acceleration of graphics functions of the remote computing server 150. In one aspect, the GPU 182 may provide graphical functions locally at the remote computing server 150. In other cases, the GPU 182 may provide graphical functions to the virtual machines 124 provided by the remote computing servers 150. The I/O interfaces(s) 184, may include any suitable interface configured to interface between the processors 180 and the components of the remote computing servers 150 and/or a variety of remote computing resources, such as the remote computing servers 150, the memory devices 152, the configuration servers 154, the storage devices 156, or one or more networking devices at the remote computing resource center 140. I/O device(s) may include any variety of suitable devices including a keyboard, a mouse, a pen, a voice input device, a touch input device, a display, speakers, a printer, etc. The communications interfaces(s) 186 may allow the remote computing servers 150 to communicate with stored databases, other computing devices or servers, user terminals, and/or other devices on the networks 120 to the user devices 132 or local area networks (LAN) 200 at the remote computing resource center 140.

The memory 190 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 190 may be a segment and/or partition of the memory 152. In other words, memory allocated to enable the functionality of the remote computing servers 150 and memory allocated to the virtual machines 124 may be partitions from the same memory devices 152. The memory 190 may store program instructions that are loadable and executable on the processor(s) 180, as well as data generated or received during the execution of these programs.

Turning to the contents of the memory 180 in more detail, the memory 180 may include an operating system (O/S) 192, applications 194, a virtual machine module 196, and/or a user interaction module 198. Each of the modules and/or software may provide functionality for the remote computing server 150, when executed by the processors 180. The modules and/or the software may or may not correspond to physical locations and/or addresses in memory 190. In other words, the contents of each of the modules may not be segregated from each other and may, in fact be stored in at least partially interleaved positions on the memory 190.

The O/S 192 may have one or more operating systems stored thereon. The processors 180 may be configured to access and execute one or more of the O/S 192 to operate the system functions of the remote computing server 150. System functions, as managed by the O/S 192 may include memory management, processor resource management, driver management, application software management, system configuration, and the like. The O/S may be any variety of suitable operating systems including, but not limited to, Google® Android®, Microsoft® Windows®, Microsoft® Windows® Server®, Linux, Apple® OS-X®, Apple® iOS®, or the like. The O/S 192 may further be utilized in the virtual machine 124 provided to the user via user devices 128 and network 120. In other words, the O/S 192 may be the framework under which the user 132 may interact with the virtual machine and the remote computing servers 150 and the remote computing resources 150, 152, 154, 156, 158.

The applications module 194 may have one or more software applications stored thereon that may be accessed and executed by the processors 180 to provide the remote computing server 150 functionality and services that may be accessed by the user 132 via a corresponding respective virtual machine 124. The one or more applications 194 may be run on the remote computing server 150 to process files and data locally on the remote computing server 150 or remotely from the remote computing server 150. The files and data may, in one aspect, be saved locally on the user device 128 or be transmitted to the remote computing servers 150 to be stored thereon, or both. As an example, consider that a user 132 opens and processes a spreadsheet file on the respective corresponding virtual machine 124. The spreadsheet file may be opened locally on the user device 128 using a spreadsheet application corresponding to the spreadsheet file. After a user 132 manipulates the spreadsheet file on the user device 128, the user 132 may choose to save the spreadsheet file locally on the user device 128, send the file to the remote computing servers 150 for storage, or both save the file locally and remotely. In certain embodiments, the user 132 may access and use remote applications that may be run remotely from the user device 132, such as at the remote computing servers 150 and presented to the user 132 within the virtual machine 124. For example, a user 132 may open and manipulate a word processing file on the corresponding respective virtual machine 124, and the word processing application program with which the user 132 interacts may be executed on the remote computing servers 150. Therefore, the word processing file may be stored, accessed, and manipulated remotely from the user device 128. The user device 128 may have one or more running thereon that may render the operation of the word processing program on a user display or user interface of the user device 128. In one aspect, the applications 194 may be configured to receive data from the remote computing servers 150 via the network 120 and render the same to the user 132. The applications 194 may further receive user input on the user device 128 and convey the input to the remote computing servers 150 via the network 120. Other non-limiting interactions between the user device 128 and the remote computing servers 150 may include executing applications on the remote computing servers 150 and storing files and data on the user device 128, or storing the files or data at both the remote computing servers 150 and locally and executing the applications that use the files or data at the remote computing servers 150.

The virtual machine module 196 may have stored thereon instructions and/or applications that when executed by processors 180 may provide various functionality associated with providing a virtual machine 124 to a particular user 132. The instructions, when executed by the processors 180 may configure the remote computing server 150 to receive a configuration file from other entities of architecture 100, such as the configuration server 154 via LAN 200 or other suitable communicative connections. The remote computing server 150 may further be configured to configure a virtual machine 124 based at least in part on the received configuration file by allocating one or more remote computing resources 150, 152, 154, 156, 158. The remote computing server 150, therefore, may provide the virtual machine and the functionality and/or service associated therewith to the user 132 via network 120 and user device 128. In certain embodiments, the configuration file received by the remote computing servers 150 may be indicative of remote computing resources 150, 152, 154, 156, 158 selected by the user 132 for configuring the user's virtual machine 124. In some cases, the user 132 may be presented with pricing, such as real time pricing, of various remote computing resources 150, 152, 154, 156, 158 that may be selected for configuring their virtual machine 124 in generating the configuration file that is used by the remote computing server 150 for configuring the virtual machine 124.

The user interaction module 198 may have stored thereon instructions and/or applications that when executed by processors 180 may provide various functionality associated with providing remote computing services to the user 132. In one aspect, the processors 180 may be configured to launch or close applications of the application module 194 based at least in part on user 132 interaction with the respective virtual machine 124. The processors 180 may also be configured to engage the user 132 with the configuration server 154 if the user 132 wishes to modify aspects of and/or reconfigure his/her/their virtual machine 124.

It will be appreciated that there may be overlap in the functionality of the instructions stored in the O/S module 192, applications module 194, virtual machine module 196, and the user interaction module 198. In fact, the functions of the three aforementioned modules 192, 194, 196, 198 may interact and cooperate seamlessly under the framework of the remote computing servers 150. Indeed, each of the functions described for any of the modules 192, 194, 196, 198 may be stored in any other module 192, 194, 196, 198 in accordance with certain embodiments of the disclosure. Further, in certain embodiments, there may be one single module that includes the instructions, programs, and/or applications described within the O/S module 192, applications module 194, virtual machine module 196, and the user interaction module 198.

The configuration servers 154 may include one or more processors 160 one or more input output (I/O) interfaces 162, one or more communications interfaces 164, and one or more memories 170. It will be appreciated that the configuration servers 154 may include other components or elements that enable the configuration servers 154 to perform the methods and processes described herein in accordance with embodiments of the disclosure. The one or more processors 160 one or more input output (I/O) interfaces 162, one or more communications interfaces 164, and one or more memories 170 are substantially similar to the one or more processors 180 one or more input output (I/O) interfaces 184, one or more communications interfaces 186, and one or more memories 190, respectively, of the remote computing servers 150. Therefore, in the interest of brevity, the description of these elements will not be repeated here.

Turning to the contents of the memory 170 in more detail, the memory 170 may include an operating system (O/S) 172, applications 174, a configuration module 176, and/or a resource management and pricing module 198. Each of the modules and/or software may provide functionality for the configuration server 154, when executed by the processors 160. The modules and/or the software may or may not correspond to physical locations and/or addresses in memory 170. In other words, the contents of each of the modules may not be segregated from each other and may, in fact be stored in at least partially interleaved positions on the memory 170.

The remote computing servers 140 may further include one or more memories 170, herein referred to as memory 170. The memory 170 may store program instructions that are loadable and executable on the processor(s) 144, as well as data generated during the execution of these programs. Depending on the configuration and type of remote computing servers 140, the memory 170 may be volatile (such as random access memory (RAM)) and/or non-volatile (such as read-only memory (ROM), flash memory, etc.). In some implementations, the memory 170 may include multiple different types of memory, such as static random access memory (SRAM), dynamic random access memory (DRAM), and/or ROM.

The memory 170 and/or the storage devices 160, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Turning to the contents of the memory 170 in more detail, the memory 170 may include an operating system (O/S) module 172, one or more application programs 174, a configuration module 176, and a resource management and pricing module 178. Each of the modules and/or software may provide functionality for the configuration servers 154, when executed by the processors 160. The modules and/or the software may or may not correspond to physical locations and/or addresses in memory 170. In other words, the contents of each of the modules may not be segregated from each other and may, in fact be stored in at least partially interleaved positions on the memory 170. The O/S module 172 and the applications module 174 may be substantially similar to the O/S module 192 and the applications module 194, respectively, and, therefore, the description of these modules 172, 174 will not be repeated here.

The configuration module 176 may have stored thereon instructions and/or applications that when executed by processors 160 may provide various functionality associated with configuring a virtual machine 124, such as by deploying underlying remote computing resources 150, 152, 154, 156, 158 with the virtual machine 124. In certain aspects, the processors 160 may be configured to determine the remote computing resources 150, 152, 154, 156, 158 that are currently available and/or currently deployed to other virtual machines 124. In other words, the processors 160 may be configured to assess the utilization status and, in some cases, create an inventory of the variety of remote computing resources 150, 152, 154, 156, 158 at the remote computing resource center 140 along with utilization status. In certain embodiments, the processors 160 are configured to generate an inventory of available remote computing resources 150, 152, 154, 156, 158 dynamically based at least in part on updated information related to deployments and/or release of virtual machines 124 and/or addition of new or removal of old remote computing resources 150, 152, 154, 156, 158 to the remote computing service provider 110. Therefore in some cases, when a new virtual machine 124 is deployed, returned or reconfigured, the configuration server 154 may generate a new inventory of remote computing resources 150, 152, 154, 156, 158 upon the indication of the changes to one or more virtual machine 124 configurations.

The processors 160, by executing instructions stored in the configuration module 176, may further be configured to provide a display of the available remote computing resources 150, 152, 154, 156, 158 to the user 132 for initial configuration and/or subsequent modification of the configuration of the user's virtual machine 124. The configuration server 154 may further be configured to receive user 132 indications of remote computing resources 150, 152, 154, 156, 158 to associate with the user's virtual machine 124. This input may be received via the user device 128 and the networks 120 as the user 132 interacts with a user interface provided by the configuration server 154, the user device 128, or the combination thereof.

Further still, the processors 160, by executing instructions stored in the configuration module 176, may be configured to generate a configuration file that may be transmitted by the configuration server 154 to the remote computing server 150 via the networks 200 or other suitable communicative links. The configuration file may be indicative of user selections of remote computing resources 150, 152, 154, 156, 158 for configuring the user's virtual machine 124. The configuration file may provide information, in one aspect, to the remote computing servers 150 for deploying particular remote computing resources 150, 152, 154, 156, 158 for the purpose of providing the user's virtual machine 124. The remote computing resources 150, 152, 154, 156, 158 that are identified on the configuration file may be identifier by any variety of suitable identifiers including, but not limited to, resource type, resource location, resource, identification number and/or code, resource manufacturer, resource capacity, resource performance capacity, or combinations thereof. In certain embodiments, the remote computing resources 150, 152, 154, 156, 158 selected for building a new virtual machine 124 or reconfiguring an existing virtual machine 124 may be identified by a unique identifying number and/or code. This unique identifying number and/or code may be provided in the configuration file that the configuration server 154 based on user 132 input. It will be appreciated that in certain embodiments, the configuration server 154 may use one or more mechanisms other than a configuration file to indicate to the remote computing server 150 remote computing resources 150, 152, 154, 156, 158 to be associated with a particular virtual machine 124.

The resource management and pricing module 178 may have instructions stored thereon that may be executed by the processors 160 to provide pricing information associated with available remote computing resources 150, 152, 154, 156, 158. Indeed the resource management and pricing module 178 may include pricing models and/or algorithms, such as regression models and the like. These models and/or algorithms may be performed by the processor 160 using remote computing resource 150, 152, 154, 156, 158 availability information to generate price lists of the available remote computing resources 150, 152, 154, 156, 158. The pricing information associated with non-deployed remote computing resources 150, 152, 154, 156, 158 may be presented to the user 132 when the user 132 configures the corresponding virtual machine 124.

In certain embodiments, when the processors 160 determine a price associated with available remote computing resources 150, 152, 154, 156, 158, the price may come with an associated effective time period. This time period may be the length of time over which the generated prices may be in effect. After that time period the prices may be subject to change based at least in part on new levels of available remote computing resources 150, 152, 154, 156, 158. In these and other embodiments, the user may be given a listing of available remote computing resources 150, 152, 154, 156, 158 and corresponding respective prices where the prices are in effect for the stipulated time period. In other words, the user 132 may have to select and configure the virtual machine before the pricing offered for the remote computing resources 150, 152, 154, 156, 158 expire.

In yet other embodiments, the configuration servers 154 may be configured to offer remote computing resource 150, 152, 154, 156, 158 prices on a per project and/or limited time deployment basis. In other words, a user 132 may choose to change an associated virtual machine 124 configuration for a limited period of time. For these types of changes to the virtual machine 124 configurations and associated deployment of remote computing resources 150, 152, 154, 156, 158, the user may be provided with different pricing for the remote computer resources 150, 152, 154, 156, 158, in some cases, than if a long term deployment is envisioned.

It will be appreciated that there may be overlap in the functionality of the instructions stored in the O/S module 172, applications module 174, configuration module 176, and the resource management and pricing module 178. In fact, the functions of the three aforementioned modules 172, 174, 176, 178 may interact and cooperate seamlessly under the framework of the configuration servers 154. Indeed, each of the functions described for any of the modules 172, 174, 176, 178 may be stored in any other module 172, 174, 176, 178 in accordance with certain embodiments of the disclosure. Further, in certain embodiments, there may be one single module that includes the instructions, programs, and/or applications described within the O/S module 172, applications module 174, virtual machine module 176, and the user interaction module 178.

Illustrative Processes

Figure 3:
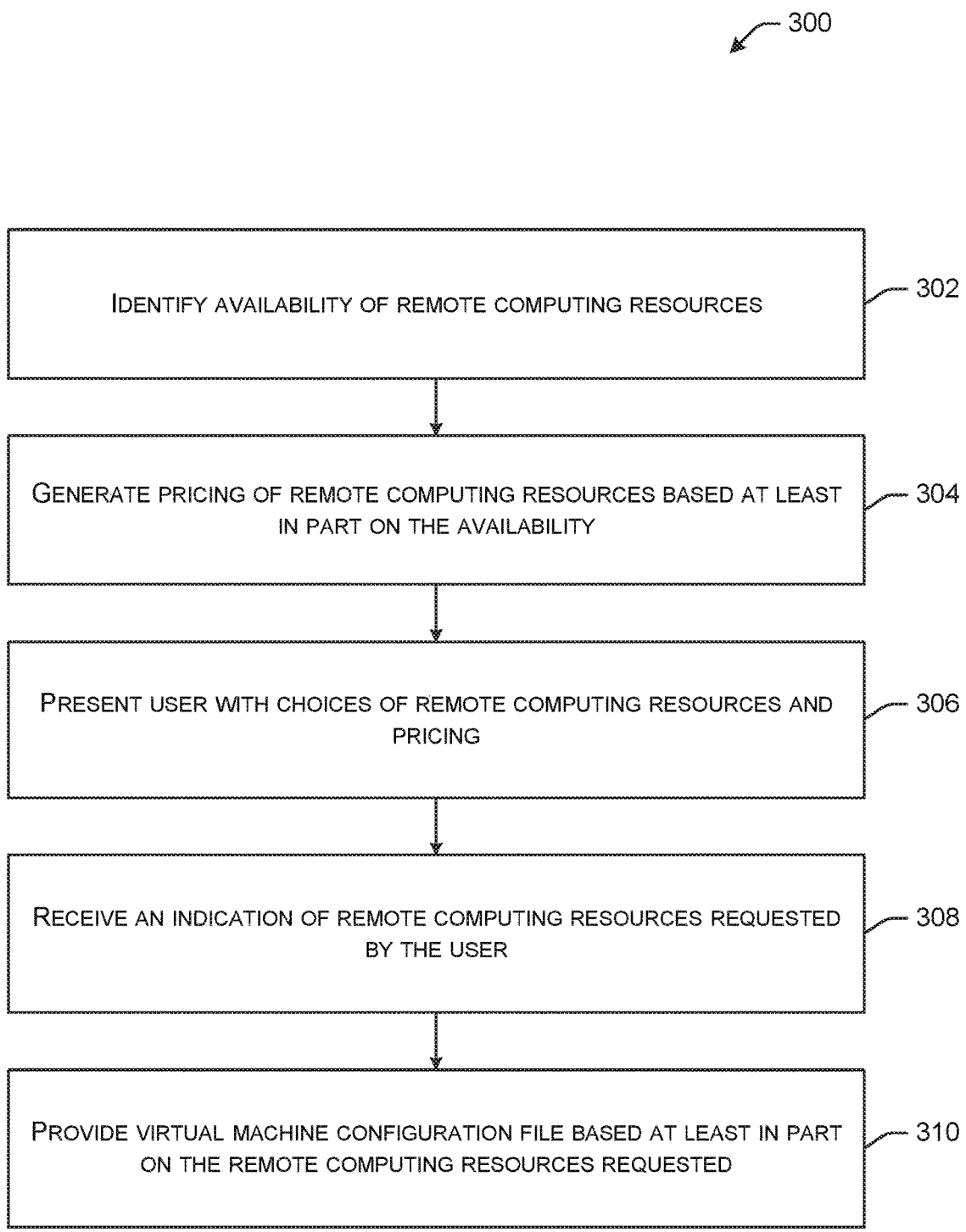
FIG. 3 is a flow diagram illustrating an example method for providing a virtual machine configuration file, in accordance with embodiments of the disclosure.

Referring now to FIG. 3, example method for providing a virtual machine configuration file, in accordance with embodiments of the disclosure is described. This method 200 may be implemented by the configuration servers 154. At block 302, available resources may be identified. These remote computing resources 150, 152, 154, 156 may be identified as deployed or available. In certain embodiments, a number of the total remote computing resources 150, 152, 154, 156, 158 of a particular type may be tallied. The information pertaining to the availability of the remote computing resources 150, 152, 154, 156, 158 may be stored and/or updated in the memory 170 of the configuration servers 154.

At block 304, pricing information may be generated based at least in part on the availability of the remote computing resources. In certain embodiments, algorithms and/or pricing models may be identified by the processors 160 to execute this process. These models and/or algorithms may be any variety of suitable pricing models including, but not limited to, regression models, machine learning models, look-up tables, or the like. These models and/or algorithms may, in certain embodiments, consider the availability of resources along with the utilization and/or deployment of the resources for providing remote computing services. The models and/or algorithms may be stored in and accessed from the memory 160 of the configuration servers 154. In certain embodiments, the processors 160 and/or other entities may develop revisions to the pricing models and/or pricing algorithms based on a variety of metrics, such as user 132 price elasticity, cost of deployment, and/or lead time in the deployment of various remote computing resources 150, 1152, 154, 156, 158. In certain embodiments, the configuration servers 154 may maintain a price list of remote computing resources 150, 152, 154, 156, 158 and may update the price list on a periodic basis or when one or more changes to a virtual machine 124 is implemented, such as by deployment or release of remote computing resources 150, 152, 154, 156, 158.

At block 306, the user may be presented with choices of remote computing resources and pricing. In one aspect, information indicative of remote computing resource availability and associated pricing information may be transmitted via the networks 120 to user device 128 for presentation to the user 132. The user may be able to view and interact with the availability and pricing information for the purposes of configuring their virtual machine. The information related to the available remote computing resources 150, 152, 154, 156, 158 and pricing may be transmitted in the form of one or more data packets to the user device 128. In some cases, the information may first be transmitted to the remote computing servers 150 and/or other entities prior to transmission to the user device 128. In some cases, the prices offered for the remote computing resources 150, 152, 154, 156, 158 may have a time period associated therewith during which the prices presented are valid. In other words, the prices offered may expire after some time and then new prices for the remote computing resources may be determined and offered to the user 132.

At block 308, an indication of remote computing resources requested by the user may be received. The indication may be in the form of one or more data packets received either directly or indirectly from the user device 128 associated with the user 132 that configures a respective corresponding virtual machine 124. The indication may be indicative of a set or a portion of a set of remote computing resources 150, 152, 154, 156, 158 that may be used to configure a particular virtual machine 124. In the cases where the pricing of the remote computing resources 150, 152, 154, 156, 158 come with an expiration time, the user 132 may be required to select the desired remote computing resources 150, 152, 154, 156, 158 within the allowed time period or risk a change in prices offered to the user 132.

It should also be noted that in some cases, the pricing offered to the user 132 for remote computing resources 150, 152, 154, 156, 158 may be based at least in part on the period of time that the remote computing resources 150, 152, 154, 156, 158 may be deployed. For example, if the requested remote computing resources 150, 152, 154, 156, 158 are to be deployed for a limited period of time, such as for a special project, then the pricing of those remote computing resources 150, 152, 154, 156, 158 may be different than the pricing of remote computing resources 150, 152, 154, 156, 158 that may be deployed for relatively longer period of time.

At block 310, a virtual machine configuration file may be provided based at least in part on the received indication of requested resources. In one aspect, the configuration file may be indicative of all or part of the remote computing resources 150, 152, 154, 156, 158 that may be used to configure a new virtual machine 124 or reconfigure a pre-existing virtual machine 124. The configuration file may be transmitted by the configuration server 154 to the remote computing server 150 in the form of one or more data packets via the networks 200 or other suitable communicative links. In one aspect, the configuration file may indicate a list of remote computing resources 150, 152, 154, 156, 158 that may be deployed to build and/or provide the virtual machine 124 to the user 132. Therefore, the configuration file may be received by the remote computing servers 150 and used to configure a virtual machine 124 by the remote computing server 150.

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
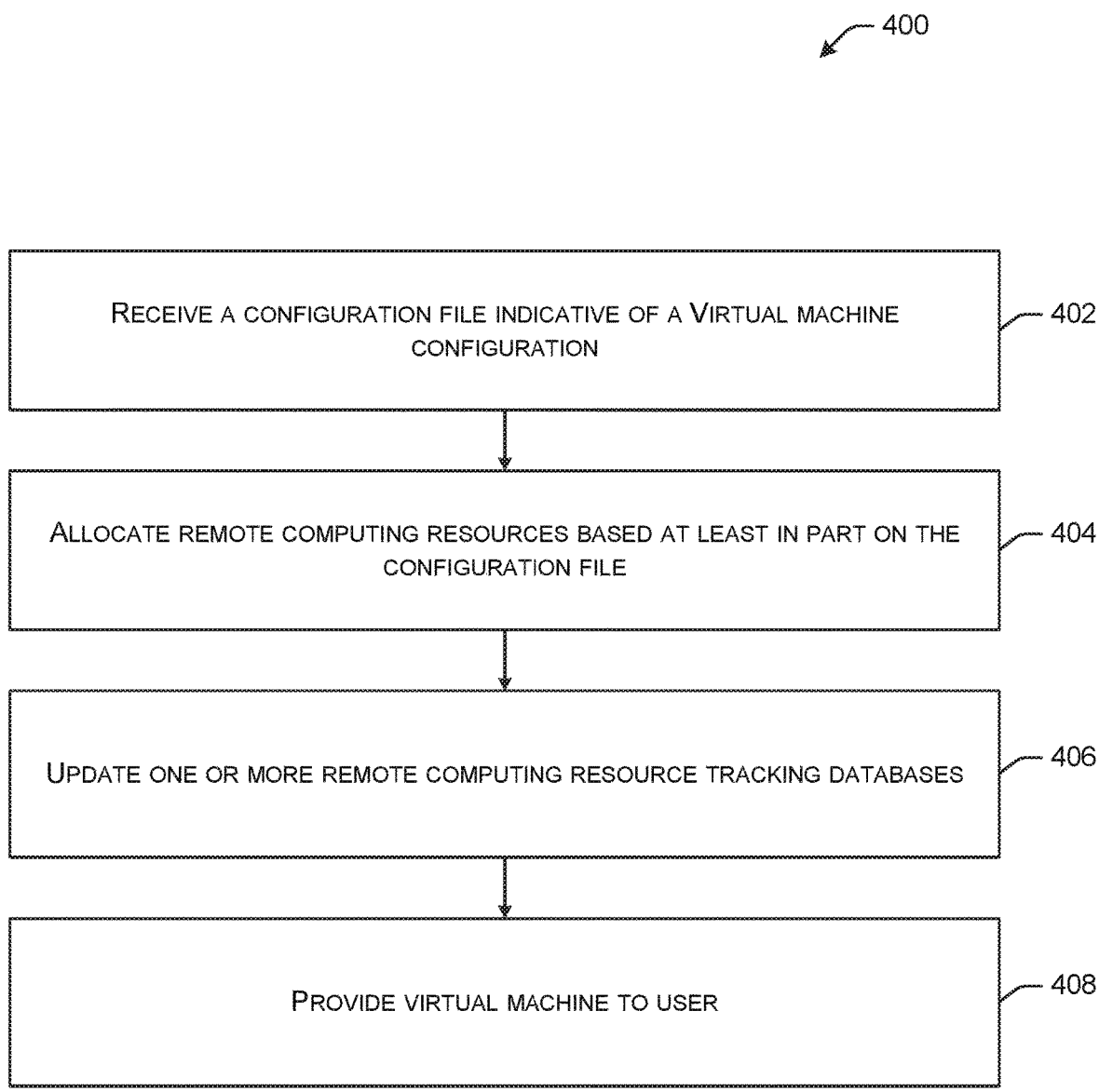
FIG. 4 is a flow diagram illustrating an example method for providing the virtual machine to a user, in accordance with embodiments of the disclosure.

Referring now to FIG. 4, an example method 400 for providing the virtual machine to a user, in accordance with embodiments of the disclosure is described. The method 400 may be performed by the remote computing servers 150. At block 402, a configuration file indicative of a virtual machine configuration may be received. This configuration file may indicate remote computing resources that may be associated with a virtual machine 124 configuration. In other words, the configuration file may indicate using one or more identifiers, one or more virtual machine 124 configurations with associated remote computing resources 150, 152, 154, 156, 158 for the particular configuration(s). It will be appreciated that in certain embodiments, the remote computing server may retrieve the configuration file from a predetermined location, such as another server and/or storage device with which the remote computing server 150 may be configured to communicate via network 200 or other suitable communicative links.

At block 404, remote computing resources may be allocated based at least in part on the received configuration file. The remote computing server 150 may, in one aspect, allocate the one or more remote computing resources 150, 152, 154, 156, 158 indicated in the received configuration file to provide the virtual machine 124 to the user 132. In certain embodiments, the remote computing resources 150, 152, 154, 156, 158 may be located and dynamically allocated by the remote computing server 150 to provide the associated virtual machine 124. The remote computing server 150 may further notify the user 132 when the user's virtual machine 124 has been configured. In the case of a reconfiguration of an existing virtual machine 124 implementation, remote computing resources 150, 152, 154, 156, 158 may be released and/or allocated based at least in part on the received configuration file without disruption or otherwise interruption in the user's ability to access the corresponding virtual machine 124. In certain embodiments, the user 132 may experience a temporary disruption of remote computing services while the user's virtual machine is reconfigured by the remote computing servers 150.

At block 406, the remote computing server may update one or more remote computing resource tracking databases. This database may be stored in memory 190, database 156, or any other suitable location. This process may be optional, since in some embodiments, the tracking of the allocated remote computing resources 150, 152, 154, 156, 158 may be performed by the configuration servers 154. At block 408, the virtual machine may be provided to the user. The virtual machine 124 may be configured according to the received configuration file.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
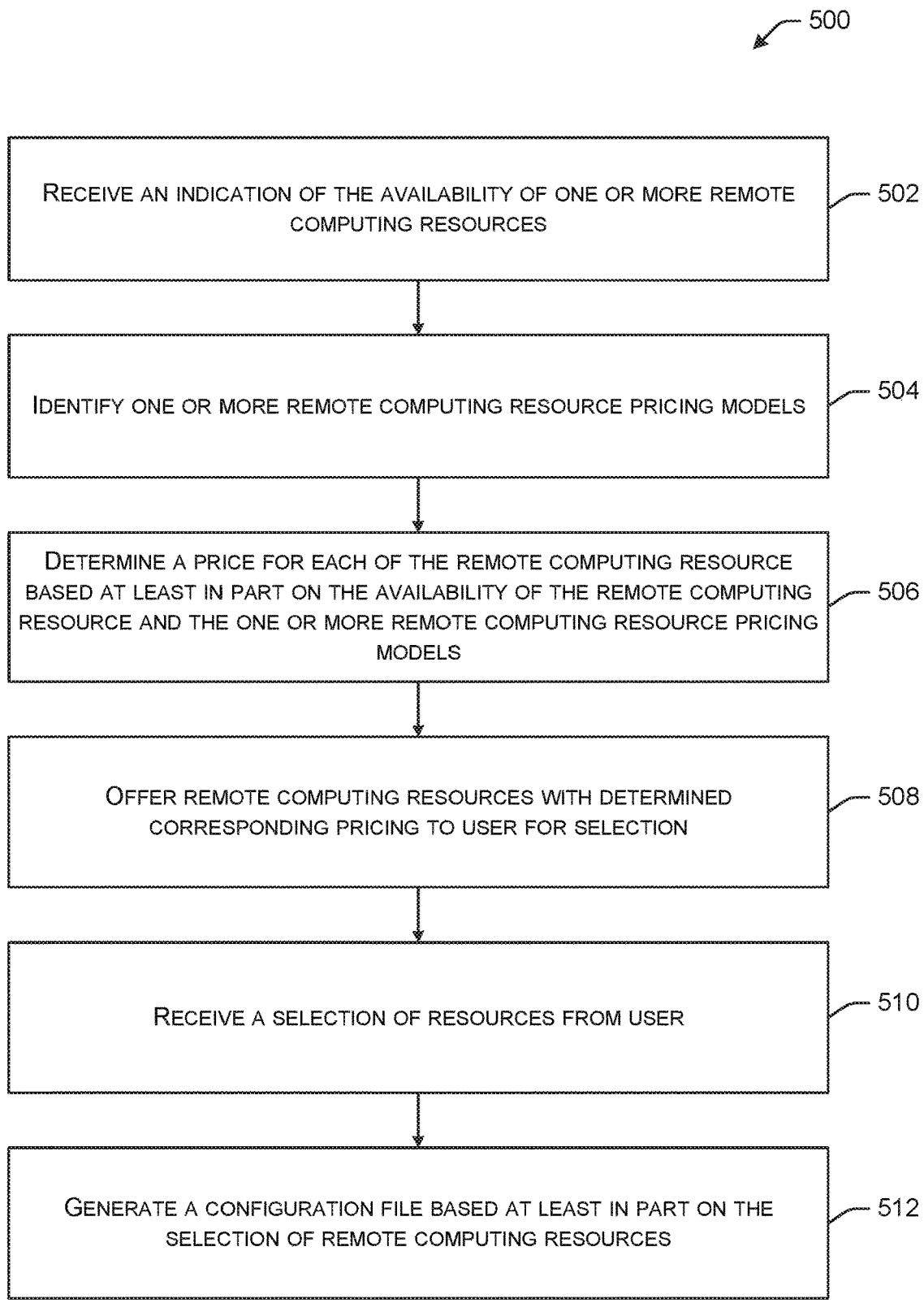
FIG. 5 is a flow diagram illustrating an example method to generate a configuration file based at least in part on providing resource pricing and receiving a selection of resources, in accordance with embodiments of the disclosure.

Referring now to FIG. 5, an example method 500 to generate a configuration file providing remote computing resource pricing and receiving a selection of remote computing resources, in accordance with embodiments of the disclosure is discussed. The method 500 may be performed by the configuration servers 154 in cooperation other entities of architecture 100. Method 500 may be an example implementation of process 306 of method 300 of FIG. 3. At block 502, an indication of the availability of one or more remote computing resources may be received. In some cases, the configuration server 154 may access one or more remote computing resource databases to assess which remote computing resources 150, 152, 154, 156, 158 are available and/or utilized. These databases may be stored in the memory 170, storage device 156, or other storage entities associated with architecture 100. In certain embodiments, the configuration server may receive a message indicative of available remote computing resources 150, 152, 154, 156, 158 from one or more other entities, such as the remote computing servers 150.

At block 504, on or more remote computing resource pricing models may be identified. These models and/or algorithms may utilize any suitable pricing techniques and may consider a variety of factors to ascribe a price to the utilization or rental of each of or groups of remote computing resources 150, 152, 154, 156, 158. The parameters that may be considered may be the current availability, current utilization, cost, expected future cost, lead time, current demand, expected demand, and/or price elasticity of demand of remote computing resources 150, 152, 154, 156, 158. In some further cases, the remote computing resource pricing models may consider the availability of complimentary or substitutional remote computing resources 150, 152, 154, 156, 158. The remote computing resource pricing models may be provided, in certain embodiments, to price remote computing resources 150, 152, 154, 156, 158 to achieve an optimized and/or near optimized revenue and/or profit for the provider of remote computing services. In other embodiments, the remote computing resource pricing models may be provided to price remote computing resources 150, 152, 154, 156, 158 to control the demand of the remote computing resource and thereby ensure availability of key remote computing resources 150, 152, 154, 156, 158.

At block 506, a price may be determined for each of the remote computing resources based at least in part on the availability of the remote computing resources and the identified remote computing resource pricing models. This process, in certain embodiments, may entail applying the algorithms associated with the pricing models to a tally of the available remote computing resources 150, 152, 154, 156, 158. At block 508, remote computing resources with the determined corresponding pricing may be offered to the user for selection. This may be performed by transmitting an indication, either directly or indirectly, of the available remote computing resources and corresponding respective prices to the user's user device 128 for presentation to the user 132, such as in a graphical format on a user interface. The indication of the available remote computing resources may be transmitted in the form of one or more data packets via the networks 120 or other suitable communicative links.

At block 510, a selection of resources may be received from the user device. The selection may be received via the networks 120 in the form of one or more data packets either directly or indirectly from the user device 128. The selection of remote computing resources 150, 152, 154, 156, 158 may be responsive to the user 132 being presented with the available remote computing resources 150, 152, 154, 156, 158 and corresponding respective prices as determined at block 506.

At block 510, a selection of remote computing resources may be received from the user. The selections may be received in the form of one or more data packets transmitted either directly or indirectly via the networks 120 or other suitable communicative links. In certain embodiments, the configuration server 154 may determine if the received selections result in a feasible virtual machine 124 configuration. In other words, the configuration server 154 may determine if the selected remote computing resources 150, 152, 154, 156, 158 can be combined to provide a virtual machine 124. In one aspect, it may be determined if the configuration as selected makes efficient use of the remote computing resources that have been selected by the user 132. If the selections do not correspond to a feasible virtual machine configuration, then the configuration sever 154 may provide an indication of the same to the user 132 via the user device 128 and the networks 120 or other suitable communicative link.

At block 512, a configuration file may be generated based at least in part on the selection or remote computing resources. The configuration file may be in the form of one or more data packets and may be indicative of the selection of remote computing resources 150, 152, 154, 156, 158 by the user 132 for the purposes of configuring the virtual machine 124. In certain embodiments, the configuration file may be indicative of a set of remote computing resources 150, 152, 154, 156, 158 that can be combined to provide a feasible virtual machine 124 implementation. In these embodiments, the configuration servers 154 and the processors 160 thereon may perform a determination that the selected remote computing resources may be combined in a feasible virtual machine 124 instance. The configuration file, once generated, may be provided to the remote computing server, as depicted in block 310 of method 300 of FIG. 3. It will be appreciated that in certain embodiments, an indication of the user 132 selection of remote computing resources 150, 152, 154, 156, 158 may be provided in a form other than the a configuration file.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
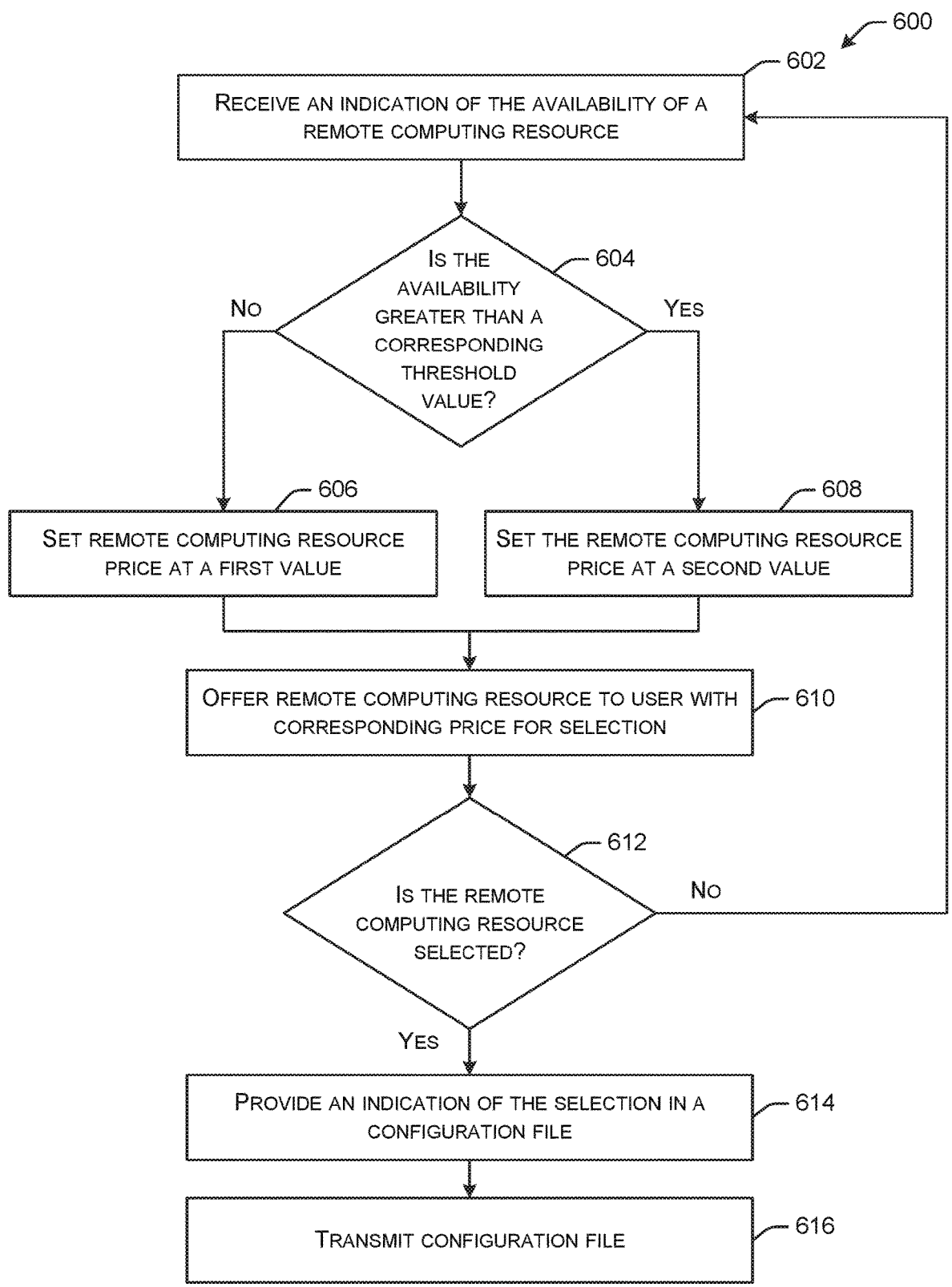
FIG. 6 is a flow diagram illustrating an example method for selecting between two different prices for a resource and providing a configuration file based on a user selection of the resource, in accordance with embodiments of the disclosure.

Referring now to FIG. 6, another example method 600 for selecting between two different prices for a resource and providing a configuration file based on a user selection of the remote computing resource, in accordance with embodiments of the disclosure. The method 600 may be performed by the configuration servers 154 in cooperation other entities of architecture 100. Method 600 may be an example implementation of process 306 of method 300 of FIG. 3. At block 602, an indication of the availability of a remote computing resources may be received. In some cases, the configuration server 154 may access one or more remote computing resource databases to assess the availability of the computing resource 150, 152, 154, 156, 158. These databases may be stored in the memory 170, storage device 156, or other storage entities associated with architecture 100. In certain embodiments, the configuration server 154 may receive a message indicative of availability of the remote computing resource 150, 152, 154, 156, 158 from one or more other entities, such as the remote computing servers 150.

At block 604, it may be determined if the availability of the remote computing resource is greater than a corresponding threshold value. The threshold value may be a value under which the number of the remote computing resource 150, 152, 154, 156, 158 may be considered relatively scarce. In certain embodiments, the remote computing service provider may consider reducing the demand by increasing the pricing of the resource when the availability of the remote computing resource 150, 152, 154, 156, 158 drops below this threshold. If at block 604 it is determined that the availability of the remote computing resource is not below the corresponding threshold value, then the remote computing resource price may be set to a first value at block 606. If, however, at block 604 it is determined that the availability of the remote computing resource is below the corresponding threshold value, then the remote computing resource price may be set to a second value at block 608. In certain embodiments, the second value may be greater than the first value.

At block 610, the remote computing resource with the determined corresponding price may be offered to the user for selection. This may be performed by transmitting an indication, either directly or indirectly, of the availability of the remote computing resource 150, 152, 154, 156, 158 and corresponding respective price to the user's user device 128 for presentation to the user 132, such as in a graphical format on a user interface. The indication of the available remote computing resource may be transmitted in the form of one or more data packets via the networks 120 or other suitable communicative links.

At block 612, it may be determined if the remote computing resource has been selected. If the user 132 has not indicated the remote computing resource 150, 152, 154, 156, 158 in the selection then the method may return to block 602 to again receive an indication of the availability of the remote computing resource. If, however, the user 132 has indicated the remote computing resource 150, 152, 154, 156, 158 in the selection then the method may proceed to block 614 where the configuration file may be generated to indicate the selections of the remote computing resource. At block 616, the configuration file may be transmitted. The configuration file may be transmitted either directly or indirectly to the remote computing servers 150 by the configuration server for the purpose of configuring the virtual machine 124.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
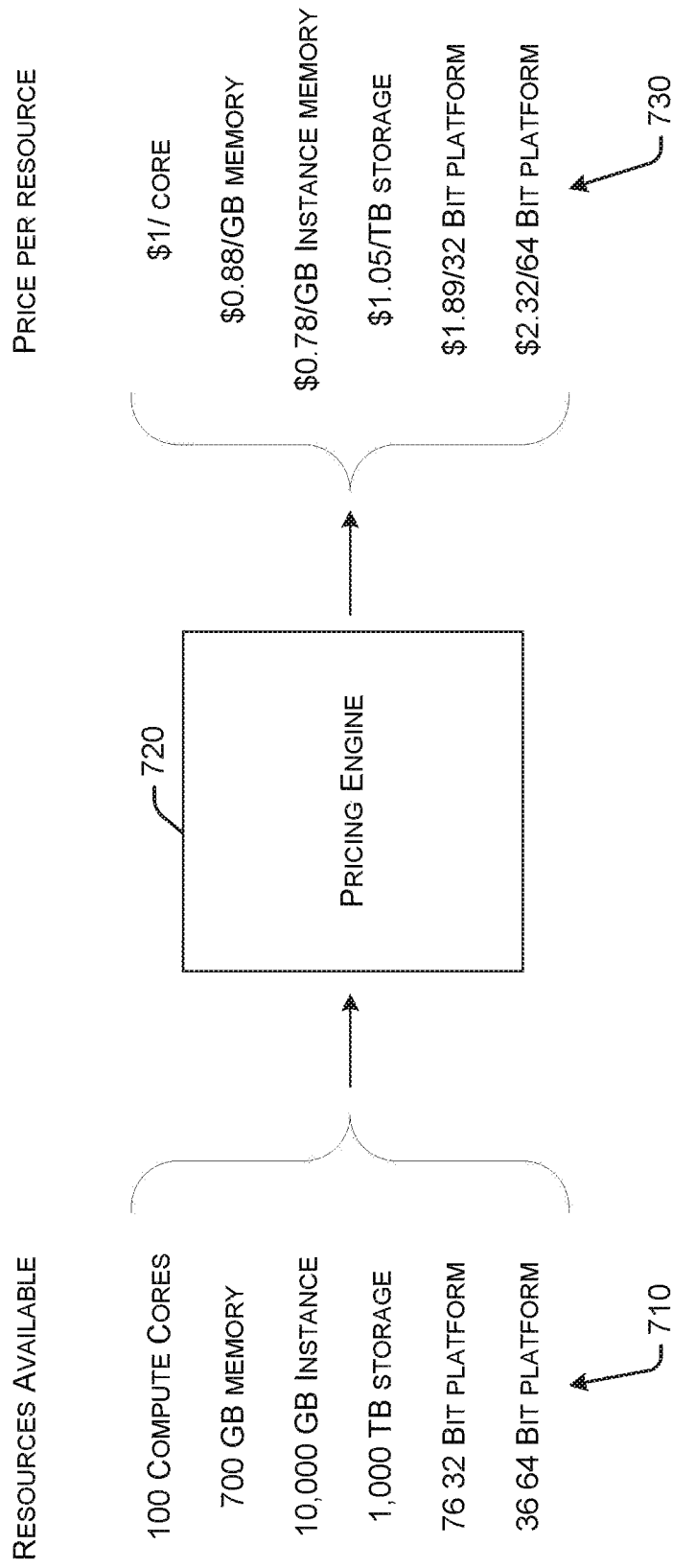
FIG. 7 is a diagram illustrating an example pricing engine for a variety of remote computing resources, in accordance with embodiments of the disclosure.

Referring now to FIG. 7, an example pricing engine 720 for providing a price for a variety of remote computing resources 150, 152, 154, 156, 158 in accordance with embodiments of the disclosure is discussed. A listing 710 of available remote computing resources with respective corresponding quantities of each of the remote computing resources may be received and/or retrieved. The listing 710 of the remote computing resources may be applied to a pricing engine 720. The pricing engine may apply one or more pricing models and/or pricing algorithms to determine the price of each of the remote computing resources as shown as 730.

Referring now to FIG. 8, an example user interface 800 for selecting remote computing resources 150, 152, 154, 156, 158 to customize a virtual machine 124, in accordance with embodiments of the disclosure is discussed. This user interface 800 may be generated based at least in part on an assessment of the availability of various remote computing resources 150, 152, 154, 156, 158. An indication of available remote computing resources 808, 824, 830, 840 and associated pricing 812 and total selection pricing 816 may be presented on the user interface 800. The user interface 800 may also provide a variety of mechanisms 820, 834 with which the user 132 may interact to provide requested selections of remote computing resources 150, 152, 154, 156, 158 for the purposes of configuring the virtual machine 124.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
one or more computing devices configured to:
provide one or more user interfaces for indicating:
resources available for inclusion in a custom virtual machine; and
pricing associated with the said resources, wherein the one or more user interfaces are configured to:
present:
a per processing core pricing for one or more processing cores available for inclusion in the custom virtual machine;
a per memory unit pricing for an amount of memory available for inclusion in the custom virtual machine; and
receive:
a selection indicating a number of processing cores to be allocated for inclusion in the custom virtual machine; and
an indication of an amount of memory to be allocated for inclusion in the custom virtual machine;
determine a first total selection pricing and a second total selection pricing for the custom virtual machine, wherein the first and second total selection pricings are respectively determined based on:
the per processing core pricing for the one or more processor cores and the selection of the number of processing cores, and
the per memory unit pricing and the indicated amount of memory;
generate one or more configuration files for the custom virtual machine based on the selection of the number of processing cores and the received indication of the amount of memory, wherein the one or more configuration files comprise a configuration for implementing the custom virtual machine, and indicate the first total selection pricing and the second total selection pricing;
implement the custom virtual machine using the configuration for the custom virtual machine included in the one or more configuration files; and
provide the custom virtual machine having number of indicated processing cores and the indicated amount of memory.

2. The system of claim 1, further comprising:
resource centers comprising servers configured to implement custom virtual machines, wherein the custom virtual machine having the number of indicated processing cores and the indicated amount of memory is implemented using one or more servers located at one or more of the resource centers.

3. The system of claim 2, wherein at least some of the resource centers are located geographically separate from other ones of the resource centers.

4. The system of claim 2, wherein resources of the servers at one or more of the resource centers, comprise:
processing cores;
graphics processors;
solid state drives;
hard disk drives; or
non-volatile memory.

5. The system of claim 1, wherein the selection indicating the number of processing cores and the indication of the amount of memory are received prior to generation of the one or more configuration files for the custom virtual machine.

6. The system of claim 1, wherein the one or more user interfaces are further configured to:
provide an indication of the first and second total selection pricings for the custom virtual machine.

7. A method, comprising:
providing one or more user interfaces for indicating resources available for inclusion in a custom virtual machine, wherein the one or more user interfaces provide per resource pricing for the resources available for inclusion into the custom virtual machine, the per resource pricing comprising per processor core pricing for one or more processor cores available for inclusion in the custom virtual machine and per memory unit pricing for an amount of memory available for inclusion in the custom virtual machine;
receiving, via the one or more user interfaces, a selection indicating a number of processing cores to be allocated for inclusion in the custom virtual machine and an indication of an amount of memory to be allocated for inclusion in the custom virtual machine;
determining a first total selection pricing and a second total selection pricing for the custom virtual machine, wherein the first and second total selection pricings are respectively determined based on:
the per processor core pricing for the one or more processor cores and the selection of the number of processing cores, and
the per memory unit pricing and the indicated amount of memory;
generating one or more configuration files for the custom virtual machine based on the selection of the number of processing cores and the indication of the amount of memory, wherein the one or more configuration files comprise a configuration for implementing the custom virtual machine, and indicate the first total selection pricing and the second total selection pricing;

implementing the custom virtual machine using the configuration for the custom virtual machine included in the one or more configuration files; and providing the custom virtual machine having the number of indicated processing cores and the indicated amount of memory.

8. The method of claim 7, wherein the one or more user interfaces are provided as a graphical user interface to a user of a service that provides the custom virtual machine.

9. The method of claim 7, wherein the selection indicating the number of processing cores and the amount of memory are received prior to generating the one or more configuration files for the custom virtual machine.

10. The method of claim 9, further comprising:

receiving, subsequent to the implementing of the custom virtual machine, a modification to the selection indicating the number of processing cores or the indication of the amount of memory; and modifying the configuration of the custom virtual machine based on the received modification.

11. The method of claim 10, wherein the modification is to add memory to the custom virtual machine, and wherein said modifying the configuration of the custom virtual machine increases the amount of memory allocated to the custom virtual machine.

12. The method of claim 7, further comprising:

providing an indication of the first and second total selection pricings for the custom virtual machine.

13. The method of claim 12, further comprising:

providing an indication of a price based on a platform type available to be allocated for the custom virtual machine.

14. One or more non-transitory, computer-readable storage media, storing program instructions that when executed on or across one or more computing devices cause the one or more computing devices to:

provide one or more user interfaces for indicating resources available for inclusion in a custom virtual machine, wherein the one or more user interfaces provide per resource pricing for the resources available for inclusion into the custom virtual machine, the per resource pricing comprising per processor core pricing for processor cores available for inclusion in the custom virtual machine and per memory unit pricing for an amount of memory available for inclusion in the custom virtual machine;

receive, via the one or more user interfaces, a selection indicating a number of processing cores to be allocated for inclusion in the custom virtual machine and an indication of an amount of memory to be allocated for inclusion in the custom virtual machine;

determine a first total selection pricing and a second total selection pricing for the custom virtual machine, wherein the first and second total selection pricings are respectively determined based on:

the per processor core pricing for the processor cores and the selection of the number of processing cores, and the per memory unit pricing and the indicated amount of memory;

generate one or more configuration files for the custom virtual machine based on the selection of the number of processing cores and the received indication of the amount of memory, wherein the one or more configuration files comprise a configuration for implementing the custom virtual machine, and indicate the first total selection pricing and the second total selection pricing;

implement the custom virtual machine using the configuration for the custom virtual machine included in the one or more configuration files; and cause the custom virtual machine having the number of indicated processing cores and the indicated amount of memory to be provided.

15. The one or more non-transitory, computer-readable storage media of claim 14, wherein:

the custom virtual machine is implemented using one or more servers located at one or more resource centers, wherein at least some of the resource centers are located geographically separate from other ones of the resource centers.

16. The one or more non-transitory, computer-readable storage media of claim 15, wherein resources of the one or more servers located at the one or more of the resource centers, comprise one or more of:

processing cores;
graphics processors;
solid state drives;
hard disk drives; or
non-volatile memory.

17. The one or more non-transitory, computer-readable storage media of claim 14, wherein the one or more user interfaces comprise:

a mechanism for selecting a processing platform type for the custom virtual machine.

18. The one or more non-transitory, computer-readable storage media of claim 17, wherein the one or more user interfaces provide a total pricing based, at least in part, on the selected processing platform type.

19. The one or more non-transitory, computer-readable storage media of claim 14, wherein the selection indicating the number of processing cores and the indication of the amount of memory are received prior to generation of the one or more configuration files for the custom virtual machine.

20. The one or more non-transitory, computer-readable storage media of claim 19, wherein the program instructions, when executed on or across the one or more processors, further cause the one or more processors to:

receive, subsequent to the implementation of the custom virtual machine, a modification to the selection indicating the number of processing cores or a modification to the indication of the amount of memory; and modify the configuration of the custom virtual machine included in the one or more configuration files based on the received modification.

* * * * *